(12) United States Patent
Ohta et al.

(10) Patent No.: US 7,492,695 B2
(45) Date of Patent: Feb. 17, 2009

(54) OPTICAL PICK-UP CAPABLE OF INCREASING THE QUANTITY OF RECEIVED LASER BEAM

(75) Inventors: Keisuke Ohta, Higashihiroshima (JP); Takeshi Kanai, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 434 days.

(21) Appl. No.: 11/094,615

(22) Filed: Mar. 29, 2005

(65) Prior Publication Data

US 2005/0213456 A1 Sep. 29, 2005

(30) Foreign Application Priority Data

Mar. 29, 2004 (JP) ............... 2004-096193

(51) Int. Cl.
G11B 7/00 (2006.01)
(52) U.S. Cl. .................. 369/112.28; 369/112.29; 369/112.05
(58) Field of Classification Search ............... 369/53.22, 369/116, 120, 112.01–112.29
See application file for complete search history.

(56) References Cited

U.S. PATENT DOCUMENTS

| | | | | |
|---|---|---|---|---|
| 5,278,813 | A * | 1/1994 | Ohnishi et al. | 369/44.14 |
| 6,411,588 | B1 * | 6/2002 | Kase et al. | 369/112.02 |
| 6,650,612 | B1 * | 11/2003 | Matsuzaki et al. | 369/112.05 |
| 7,023,787 | B2 * | 4/2006 | Katayama | 369/112.01 |
| 7,218,591 | B2 * | 5/2007 | Miyake | 369/53.26 |
| 7,274,633 | B2 * | 9/2007 | Nakagawa | 369/44.42 |
| 7,315,504 | B2 * | 1/2008 | Nakamura | 369/116 |
| 7,336,587 | B2 * | 2/2008 | Sun | 369/112.28 |
| 2002/0105892 | A1 * | 8/2002 | Onishi et al. | 369/112.17 |
| 2002/0118611 | A1 * | 8/2002 | Kim et al. | 369/44.11 |
| 2003/0179677 | A1 | 9/2003 | Nakamura | |
| 2006/0164959 | A1 * | 7/2006 | Kamei et al. | 369/120 |
| 2006/0233081 | A1 * | 10/2006 | Ohta | 369/112.01 |

FOREIGN PATENT DOCUMENTS

| JP | 04-332185 A | 11/1992 |
|---|---|---|
| JP | 7-93801 A | 4/1995 |
| JP | 11-273119 | 10/1999 |
| JP | 2000-030285 A | 1/2000 |
| JP | 2001-052368 | 2/2001 |
| JP | 2002-092929 | 3/2002 |

(Continued)

Primary Examiner—Tan X Dinh
(74) Attorney, Agent, or Firm—Morrison & Foerster LLP

(57) ABSTRACT

An optical pickup device according to the present invention is constituted so that a laser beam emitted from a light receiving and emitting integral-type element is transmitted or reflected by a beam splitter, transformed to a parallel beam by a collimator lens, introduced into an objective lens, transmitted through the objective lens, and collected on a recording surface of an optical disc and the laser beam thus collected is returned to the light receiving and emitting integral-type element via a reverse path after the laser beam is reflected by the recording surface of the optical disc. The optical pickup device includes a front monitor light receiving element that is arranged between the light receiving and emitting integral-type element and the collimator lens, receives a part of the laser beam emitted from the light receiving and emitting element, and detects a quantity of the received laser beam. The front monitor light receiving element includes a received-light-quantity increasing unit that increases the quantity of the received laser beam.

8 Claims, 7 Drawing Sheets

FOREIGN PATENT DOCUMENTS

| JP | 2003-16685 A | 1/2003 |
| JP | 2003-151167 A | 5/2003 |
| JP | 2003-257064 * | 9/2003 |
| JP | 2003-346352 A | 12/2003 |
| JP | 2004-71084 A | 3/2004 |

* cited by examiner

SECTINAL VIEW ON CUT SURFACE A

SECTINAL VIEW ON CUT SURFACE B (A)

(B)

OPTICAL PICK-UP CAPABLE OF INCREASING THE QUANTITY OF RECEIVED LASER BEAM

CROSS-REFERENCE TO RELATED APPLICATION

This application is related to Japanese application No. 2004-096193 filed on Mar. 29, 2004 whose priority is claimed under 35 USC §119, the disclosure of which is incorporated by reference in its entirety.

BACKGROUND OF THE INVENTION (1) Field of the Invention

The present invention relates to an optical pickup device capable of performing at least one of reproduction (playback), recording and erasure of information with respect to an optical disc (optical information recording medium) represented by a compact disc (CD) or a digital versatile disc (DVD). More particularly, the present invention relates to an optical pickup device that controls an output of a laser beam using a front monitor light receiving element.

(2) Description of the Related Art

FIG. 10 is a schematic diagram of a conventional horizontal arrangement-type optical pickup device using two light receiving and emitting integral-type elements 1a and 1b. In this optical pickup device, a laser beam emitted from each of the light receiving and emitting integral-type elements 1a and 1b and having an approximately horizontal optical axis 100 is transmitted or reflected by a beam splitter 12. The transmitted or reflected laser beam, which is transformed to a parallel beam by a collimator lens 13, is reflected approximately at a right angle in an upward direction, in which an objective lens 15 is present, by a raising mirror 14. The reflected laser beam is transmitted through the objective lens 15 and collected on a recording surface of an optical disc 16 that is arranged approximately horizontally.

The laser beam thus collected is reflected by the recording surface of the optical disc 16 and returned to each of the light receiving and emitting integral-type elements 1a and 1b via a reverse path to a forward path. This laser beam is then introduced onto a light receiving surface by a diffraction grating (not shown) provided on each of the light receiving and emitting integral-type elements 1a and 1b. An electric signal is detected according to a quantity of the laser beam received by the light receiving surface.

In such an optical pickup device, a part of the laser beam emitted from each of the light receiving and emitting integral-type elements 1a and 1b is directly made incident on a front monitor light receiving element 17 that is arranged approximately horizontally (i.e., approximately in parallel to the optical axis 100) in the vicinity of the beam splitter 12.

As shown in FIG. 11, the front monitor light receiving element 17 includes a substrate portion 20, a light receiving portion 21 fixed to a lower surface of the substrate portion 20, and a transparent resin mold portion 22 sealing the light receiving portion 21 to retain the portion 21 at a fixed position. This front monitor light receiving element 17 is arranged so that a light receiving surface (lower surface) of the light receiving portion 21 is approximately in parallel to the optical axis 100. The front monitor light receiving element 17 outputs the electric signal according to the quantity of the incident light, and controls an output of each of the light receiving and emitting integral-type elements 1a and 1b using an automatic power control (APC) circuit so that the laser beam collected on the optical disc 16 has an appropriate intensity.

The other conventional technique relating to the optical pickup device is disclosed in, for example, JP-A 2003-257064.

The optical pickup device configured as shown in FIGS. 10 and 11 has, however, the following disadvantages. The light receiving surface of the light receiving portion 21 of the front monitor light receiving element 17 is arranged to be approximately in parallel to the optical axis 100, and the quantity of the light incident on the front monitor light receiving element 17 is insufficient. It is therefore necessary to increase a control gain of the APC circuit. If the control gain is increased, however, a responsivity of the APC circuit is deteriorated. As a result, the optical pickup device cannot correspond to high-speed reproducing (playback) and high-speed recording of information from and to the optical disc represented by the CD or the DVD, and the optical pickup device may possibly be considerably degraded.

SUMMARY OF THE INVENTION

According to the present invention, there is provided an optical pickup device constituted so that a laser beam emitted from a light receiving and emitting integral-type element is transmitted or reflected by a beam splitter, transformed to a parallel beam by a collimator lens, introduced into an objective lens, transmitted through the objective lens, and collected on a recording surface of an optical disc and the laser beam thus collected is returned to the light receiving and emitting integral-type element via a reverse path after the laser beam is reflected by the recording surface of the optical disc, wherein a front monitor light receiving element which receives a part of the laser beam emitted from the light receiving and emitting element and detects a quantity of the received laser beam, is arranged between the light receiving and emitting integral-type element and the collimator lens, the front monitor light receiving element including a received-light-quantity increasing unit that increases the quantity of the received laser beam.

The received-light-quantity increasing unit is designed to make a part of direct light of the laser beam emitted from the light receiving and emitting integral-type element incident on the light receiving surface of the front monitor light receiving element in a large quantity, as compared with the conventional technique.

According to the optical pickup device of the present invention, by providing the received-light-quantity increasing unit, the quantity of light incident on the light receiving surface of the front monitor light receiving element can be increased, as compared with the conventional technique. It is therefore possible to control the optical pickup device so as to stably output a laser beam. Further, it is possible to reproduce (playback), record or erase information at a high speed with respect to the optical disc represented by the CD or the DVD.

DESCRIPTION OF THE PREFERRED EMBODIMENTS

Figure 1:
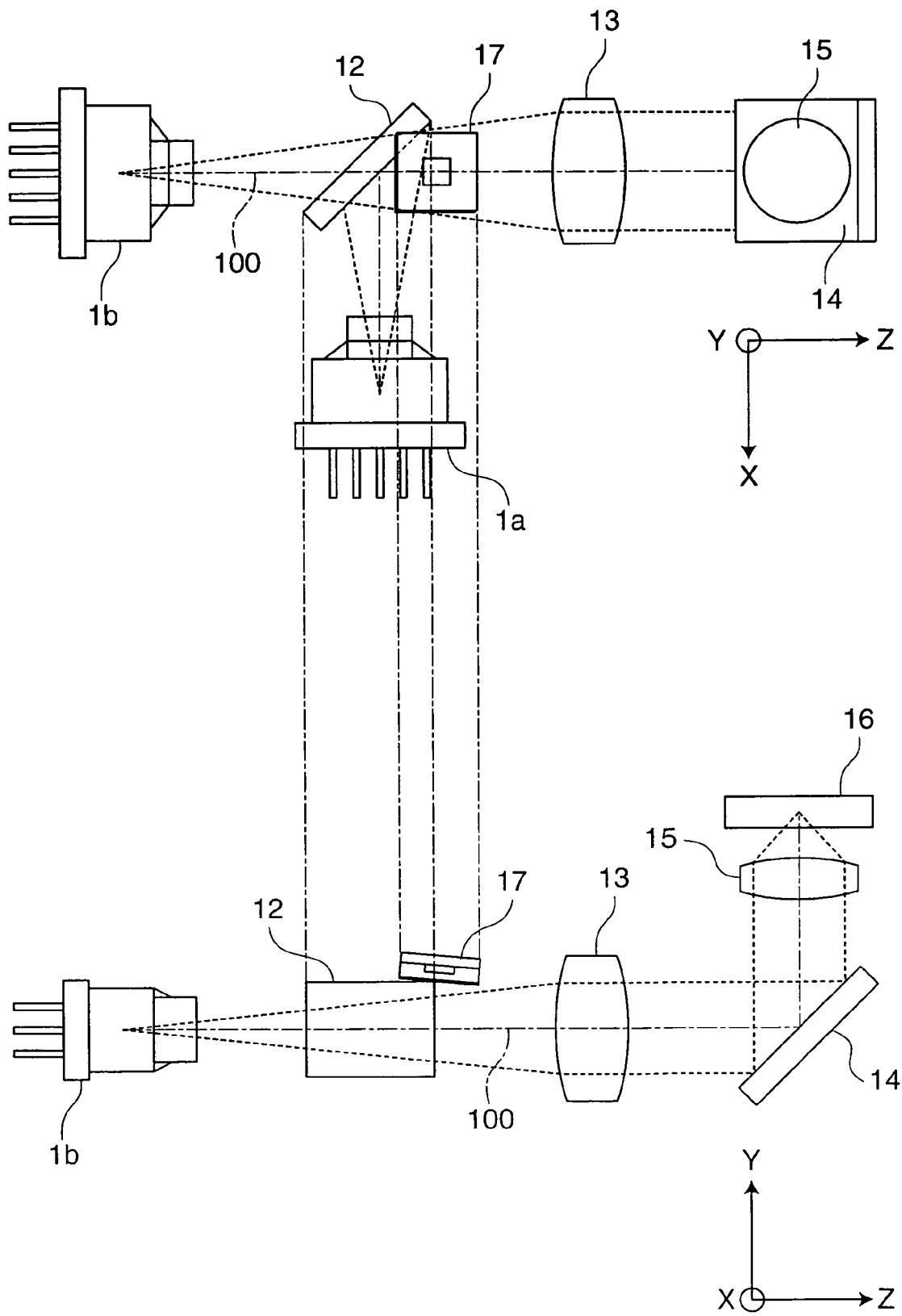
FIG. 1 is a schematic diagram of a horizontal arrangement-type optical pickup device according to a first embodiment of the present invention.

The optical pickup device according to the present invention may be any one of a horizontal arrangement-type optical pickup device having an optical disc to be arranged approximately in parallel to a horizontal plane, a vertical arrangement-type optical pickup device having an optical disc to be arranged approximately perpendicular to the horizontal plane, and an optical pickup device having an optical disc to be arranged at an arbitrary angle with respect to the horizontal plane.

The received-light-quantity increasing unit in the optical pickup device according to the present invention includes, for example, a substrate portion having inner and outer surfaces, a light receiving portion having a light receiving surface and fixed to the inner surface of the substrate portion, and a protruding resin mold portion that seals the light receiving portion with a transparent resin between the resin mold portion and the inner surface of the substrate portion.

According to one example of the received-light-quantity increasing unit, the received-light-quantity increasing unit is provided so that the inner surface of the substrate portion is inclined at a predetermined angle from a position approximately in parallel to the optical axis of the light receiving and emitting integral-type element toward the light receiving and emitting integral-type element and the light receiving surface of the light receiving portion is approximately in parallel to the inner surface of the substrate portion. Examples of means for inclining the substrate portion at the predetermined angle include an abutment surface at a predetermined angle which is provided on an optical pickup device housing, and against which the approximately flat lower surface of the resin mold portion of the received-light-quantity increasing unit is pressed.

The received-light-quantity increasing unit is mounted on, for example, a flexible printed circuit (FPC) board. A slit portion is preferably provided in the FPC board so as to alleviate a stress of the FPC board generated when the substrate portion of the received-light-quantity increasing unit is pressed through the FPC board. This slit portion is provided in each of two sides farther from the light receiving and emitting integral-type element among four sides of a rectangular external portion of the mounted received-light-quantity increasing unit.

This received-light-quantity increasing unit is provided so that the inner surface of the substrate portion is inclined at the predetermined angle from the position approximately in parallel to the optical axis of the light receiving and emitting integral-type element toward the light receiving and emitting integral-type element and the light receiving surface of the light receiving portion is approximately in parallel to the inner surface of the substrate portion. As a result, the received-light-quantity increasing unit is arranged in a state where the light receiving surface of the light receiving portion is inclined at the predetermined angle toward the light receiving and emitting integral-type element. Thus, a part of direct light of the laser beam emitted from the light receiving and emitting integral-type element can be made incident on the light receiving surface of the front monitor light receiving element in a large quantity, as compared with the conventional technique.

The "predetermined angle" formed when the received-light-quantity increasing unit is arranged so that the inner surface of the substrate portion is inclined at the predetermined angle from the position approximately in parallel to the optical axis of the light receiving and emitting integral-type element toward the light receiving and emitting integral-type element can be appropriately set according to a type, a size, or a performance of a constituent element of the optical pickup device, e.g., the light receiving and emitting integral-type element, the beam splitter or the front monitor light receiving element, or according to a target value of the control gain of the APC circuit.

According to another example of the received-light-quantity increasing unit in the optical pickup device according to the present invention, the received-light-quantity increasing unit is provided so that the inner surface of the substrate portion is approximately in parallel to an optical axis of the light receiving and emitting integral-type element and the light receiving surface of the light receiving portion is inclined at the predetermined angle from a position approximately in parallel to the optical axis of the light receiving and emitting integral-type element toward the light receiving and emitting integral-type element.

This received-light-quantity increasing unit is arranged in a state where the inner surface of the substrate portion is arranged approximately in parallel to the optical axis of the light receiving and emitting integral-type element and the light receiving portion is inclined at the predetermined angle from the position approximately in parallel to the optical axis of the light receiving and emitting integral-type element toward the light receiving and emitting integral-type element. Thus, a part of direct light of the laser beam emitted from the light receiving and emitting integral-type element can be made incident on the light receiving surface of the front monitor light receiving element in a large quantity, as compared with the conventional technique.

The "predetermined angle" formed when the received-light-quantity increasing unit is arranged so that the light receiving surface of the light receiving portion is inclined at the predetermine angle from the position approximately in parallel to the optical axis of the light receiving and emitting integral-type element toward the light receiving and emitting integral-type element can be appropriately set similarly to the above-described manner.

According to still another example of the received-light-quantity increasing unit in the optical pickup device according to the present invention, the received-light-quantity increasing unit is constituted so that the resin mold portion is formed into an approximately hemispherical or approximately semi-convex lens shape, thereby increasing the quantity of the laser beam received by the light receiving portion.

This received-light-quantity increasing unit is arranged so that a part of direct light of the laser beam emitted from the light receiving and emitting integral-type element is made incident on the light receiving surface of the light receiving portion from more directions, as compared with the optical pickup device in which the lower surface of the resin mold portion is formed flat. It is therefore possible to introduce a larger quantity of the light onto the light receiving surface.

According to yet another example of the received-light-quantity increasing unit in the optical pickup device according to the present invention, the received-light-quantity increasing unit is constituted to include a diffraction grating on a protruding surface of the resin mold portion, the protruding surface being formed approximately flat, thereby increasing the quantity of the laser beam received by the light receiving portion.

This received-light-quantity increasing unit is arranged so that the protruding surface of the resin mold portion is flat but the diffraction grating is provided on the surface. Therefore, unlike a case where the diffraction grating is not present, a part of direct light of the laser beam emitted from the light receiving and emitting integral-type element is diffracted in the direction of the light receiving surface of the light receiving portion by the diffraction grating. It is therefore possible to introduce the larger quantity of light onto the light receiving surface.

According to yet another example of the received-light-quantity increasing unit in the optical pickup device according to the present invention, the received-light-quantity increasing unit is provided so that a protruding surface of the resin mold portion is formed to be approximately flat and to be inclined at a predetermined angle with respect to the inner surface of the substrate portion and the protruding surface is pressed against an abutment surface provided on an optical pickup device housing, whereby the light receiving surface of the light receiving portion is inclined at a predetermined angle from a position approximately in parallel to an optical axis of the light receiving and emitting integral-type element toward the light receiving and emitting integral-type element.

This received-light-quantity increasing unit is arranged so that the protruding surface of the resin mold portion, which protruding surface is formed approximately flat, is inclined at the predetermined angle with respect to the inner surface of the substrate portion. By pressing the protruding surface of the resin mold portion against the abutment surface provided on the optical pickup device housing, the light receiving surface of the light receiving portion is fixed while being inclined at the predetermined angle from the position approximately in parallel to the optical axis of the light receiving and emitting integral-type element toward the light receiving and emitting integral-type element. It is thereby possible to make a part of direct light of the laser beam emitted from the light receiving and emitting integral-type element incident on the light receiving surface of the front monitor light receiving element in a large quantity, as compared with the conventional technique.

Hereinafter, several embodiments of the present invention will be described with reference to the accompanying drawings only for exemplary purposes.

First Embodiment

FIG. 1 is a schematic diagram of a horizontal arrangement-type optical pickup device using two light receiving and emitting integral-type elements 1a and 1b according to a first embodiment of the present invention. A laser beam emitted from each of the light receiving and emitting integral-type elements 1a and 1b and having an approximately horizontal optical axis 100 (Z axis) is transmitted or reflected by a beam splitter 12. The transmitted or reflected laser beam, which is transformed to a parallel beam by a collimator lens 13, is reflected approximately at a right angle in an upward direction, in which an objective lens 15 is present, by a raising mirror 14. The reflected laser beam is transmitted through the objective lens 15 and collected on a recording surface of an optical disc 16 that is arranged approximately horizontally.

The laser beam thus collected is reflected by the recording surface of the optical disc 16 and returned to each of the light receiving and emitting integral-type elements 1a and 1b via a reverse path to a forward path. This laser beam is then introduced onto a light receiving surface by a diffraction grating (not shown) provided on each of the light receiving and emitting integral-type elements 1a and 1b. An electric signal according to a quantity of the received light on the light receiving surface is detected.

This optical pickup device also includes a front monitor light receiving element (received-light-quantity increasing unit) 17 that directly receives a part of the laser beam emitted from each of the light receiving and emitting integral-type elements 1a and 1b. The front monitor light receiving element 17 is provided between the beam splitter 12 and the collimator lens 13. The front monitor light receiving element 17 outputs the electric signal according to the quantity of the received light, and controls an output of each of the light receiving and emitting integral-type elements 1a and 1b using an automatic power control (APC) circuit so that the laser beam collected onto the optical disc 16 has an appropriate intensity.

Figure 2:
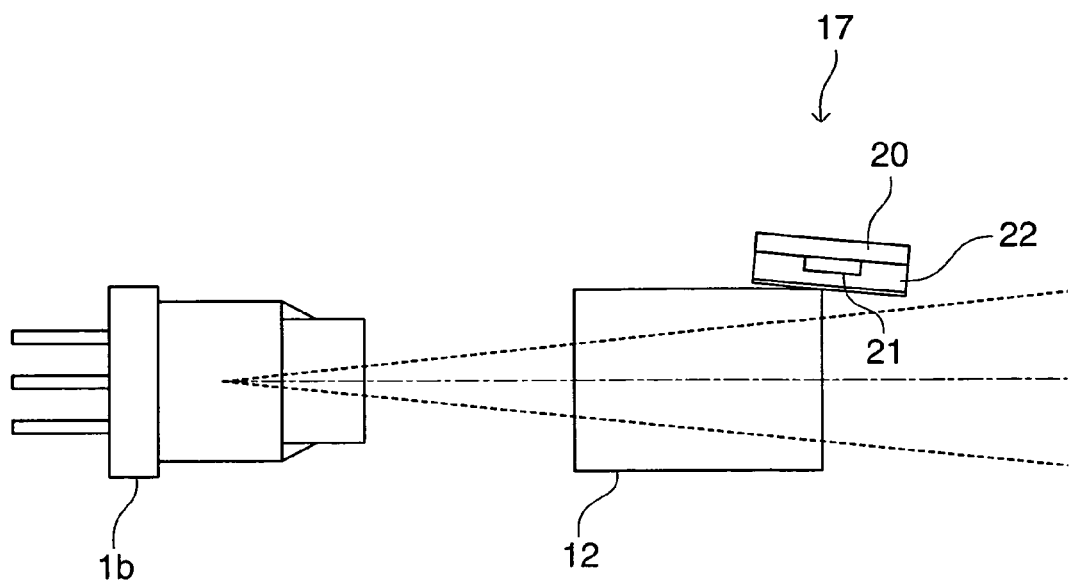
FIG. 2 is a partially enlarged view of the optical pickup device shown in FIG. 1.
Figure 3:
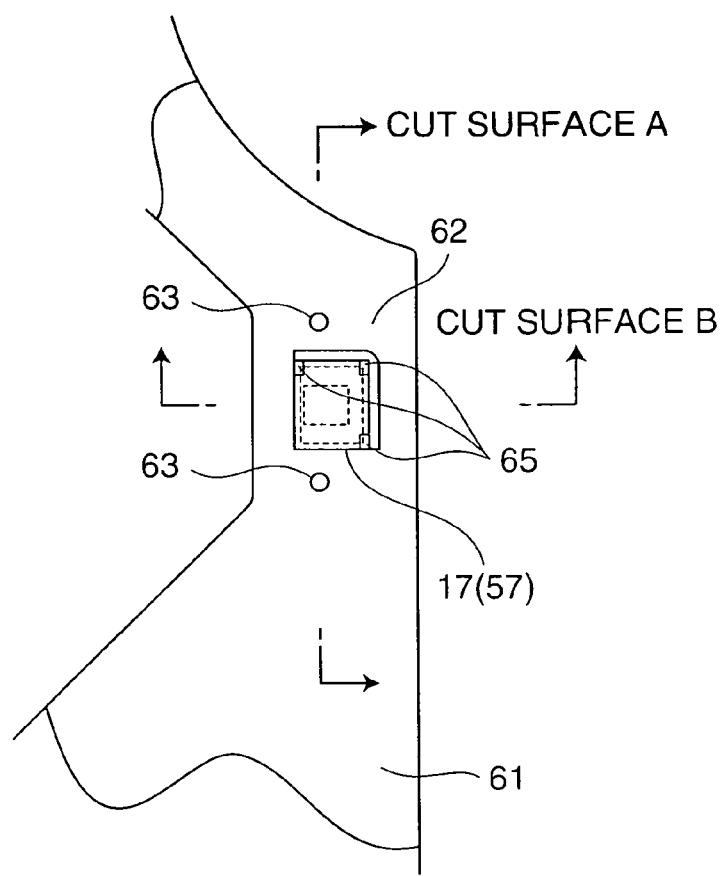
FIG. 3 is a partially enlarged view of optical pickup devices according to the first embodiment and a fifth embodiment of the present invention, which show a positional relationship between a housing and a front monitor light receiving element of the optical pickup device.
Figure 4:
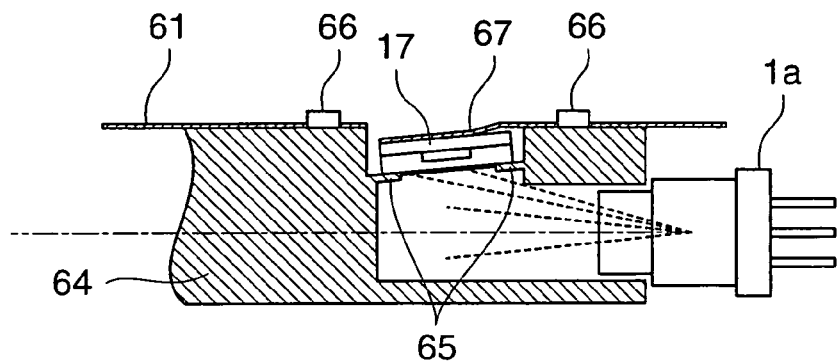
FIG. 4 is a partial cross-sectional view of a portion of the optical pickup device according to the first embodiment of the present invention, which portion corresponds to FIG. 3.
Figure 4:
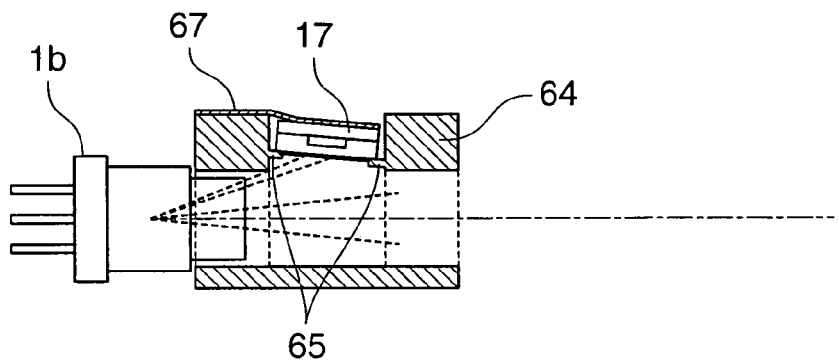

As shown in FIGS. 2 to 4, the front monitor light receiving element 17 includes a substrate portion 20 having upper and lower surfaces (inner and outer surfaces) parallel to each other, a flat light receiving portion 21 fixed to the lower surface (inner surface) of the substrate portion 20, and a transparent resin mold portion 22 sealing the light receiving portion 21 to retain the portion 21 at a fixed position. This front monitor light receiving element 17 is arranged in a state where the substrate portion 20 is inclined at about five degrees from an approximately horizontal plane (X-Z plane) toward a light receiving and emitting surface (Y-Z plane) of the light receiving and emitting integral-type element 1a and inclined at about five degrees toward a light receiving and emitting surface (X-Y plane) of the light receiving and emitting integral-type element 1b. The light receiving portion 21 has a light receiving surface (lower surface) fixed to the lower surface of the substrate portion 20 approximately in parallel thereto. As a result, the front monitor light receiving element 17 is arranged in a state where the light receiving surface of the light receiving portion 21 is inclined from the approximately horizontal plane (X-Z plane) toward the light receiving and emitting surface (Y-Z plane) of the light receiving and emitting integral-type element 1a and the light receiving and emitting surface (X-Y plane) of the light receiving and emitting integral-type element 1b both at about five degrees.

As shown in FIGS. 3 and 4, this arrangement is realized by pressing the front monitor light receiving element 17 against three abutment surfaces 65 formed on an optical pickup device housing 64. In FIGS. 3 and 4, 61 denotes a flexible printed circuit (FPC) board on which the front monitor light receiving element 17 is mounted, 62 denotes an L-shaped slit portion formed in the FPC board 61 along two directions of an external shape of the front monitor light receiving element 17, 63 denotes a positioning hole formed in the FPC board 17, and 66 denotes a positioning pin fitted into each positioning hole 63.

As shown in FIG. 4, the abutment surface 65 formed on the housing 64 is angled so that an inclination angle of about five degrees with respect to the approximately horizontal plane is formed on each of a cut surface A and a cut surface B. In pressing, the front monitor light receiving element 17 as well as the FPC board 61 is pressed against each abutment surface 65 from a reverse side with the FPC board 61, on which the front monitor light receiving element 17 is mounted, put between the front monitor light receiving element 17 and the abutment surface 65. To press the front monitor light receiving element 17, an FPC board pressing spring 67 shown in FIG. 4 or the like is preferably employed. Further, the slit portions 62 are formed to alleviate a stress generated from the FPC board 61 itself during this pressing.

In the optical pickup device according to the first embodiment, the light receiving portion 21 is arranged in a state where the light receiving surface is inclined from the approximately horizontal plane (X-Z plane) toward the light receiving and emitting surface (Y-Z plane) of the light receiving and emitting integral-type element 1a and the light receiving and emitting surface (X-Y plane) of the light receiving and emitting integral-type element 1a both at about five degrees. Thus, the laser beam emitted from each of the light receiving and emitting integral-type elements 1a and 1b in a large quantity can be made incident on the light receiving surface of the light receiving portion 21 of the front monitor light receiving element 17, as compared with the conventional technique. It is therefore possible to control the optical pickup device so as to stably output a laser beam. Further, it is possible to reproduce, record or erase information at a high speed with respect to the optical disc 16 represented by a CD or a DVD.

Second Embodiment

Figure 5:
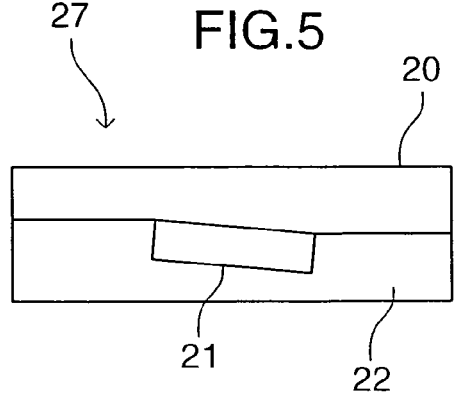
FIG. 5 is a partially enlarged view of an optical pickup device according to a second embodiment of the present invention.

As shown in FIG. 5, a front monitor light receiving element (received-light-quantity increasing unit) 27 provided in an optical pickup device according to a second embodiment is configured so that a substrate portion 20 is arranged approximately horizontally and a light receiving portion 21 is arranged to be fixed in a state where a light receiving surface is inclined from an approximately horizontal plane (X-Z plane) toward a light receiving and emitting surface (X-Y plane) of a light receiving and emitting element 1b at about five degrees. The other constituent elements of the optical pickup device according to the second embodiment are equal to those of the optical pickup device according to the first embodiment. It is noted that it is unnecessary to incline each of the abutment surfaces 65 provided on the housing 64 against which the lower surface of the resin mold portion 22 of the front monitor light receiving element 27 is pressed.

In the optical pickup device according to the second embodiment, the substrate portion 20 is arranged approximately horizontally and the light receiving portion 21 is arranged in a state where the light receiving surface is inclined from the approximately horizontal plane (X-Z plane) toward the light receiving and emitting surface (X-Y plane) of the light receiving and emitting integral-type element 1b at about five degrees. Thus, the laser beam emitted from the light receiving and emitting integral-type element 1b can be made incident on the light receiving surface of the light receiving portion 21 of the front monitor light receiving element 27 in a large quantity, as compared with the conventional technique. It is therefore possible to control the optical pickup device so as to stably output a laser beam. Further, it is possible to reproduce, record or erase information at a high speed with respect to the optical disc 16 represented by a CD or a DVD.

Third Embodiment

Figure 6:
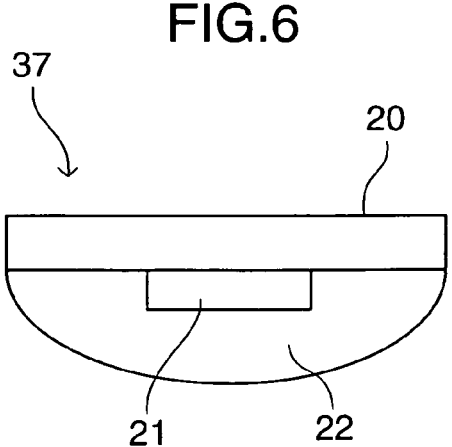
FIG. 6 is a partially enlarged view of an optical pickup device according to a third embodiment of the present invention.

As shown in FIG. 6, a front monitor light receiving element (received-light-quantity increasing unit) 37 provided in an optical pickup device according to a third embodiment is configured so that a resin mold portion 22 is formed into an approximately semi-convex lens shape having a convex downward. The other constituent elements of the optical pickup device according to the third embodiment are equal to those of the optical pickup device according to the first embodiment.

In the optical pickup device according to the third embodiment, the resin mold portion 22 is formed into the approximately semi-convex shape having a convex downward. Thus, the laser beam emitted from the light receiving and emitting integral-type element 1b can be made incident on the light receiving surface of the light receiving portion 21 from many directions, as compared with an optical pickup device in which the lower surface of the resin mold portion 22 is formed flat. It is therefore possible to control the optical pickup device so as to stably output a laser beam. Further, it is possible to reproduce, record or erase information at a high speed with respect to the optical disc 16 represented by a CD or a DVD.

Fourth Embodiment

Figure 7:
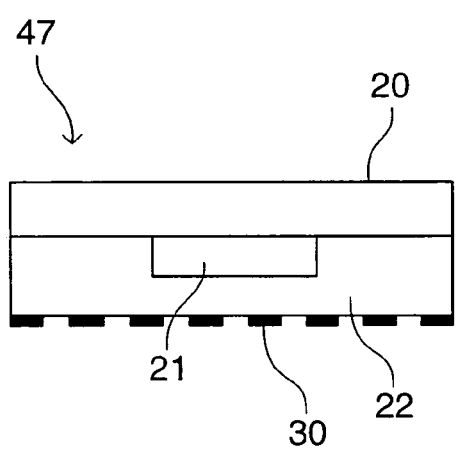
FIG. 7 is a partially enlarged view of an optical pickup device according to a fourth embodiment of the present invention.

As shown in FIG. 7, a front monitor light receiving element (received-light-quantity increasing unit) 47 provided in an optical pickup device according to a fourth embodiment is configured so that a lower surface of a resin mold portion 22 is flat and parallel to an upper surface of a substrate portion 20 and a diffraction grating 30 is fixed to the lower surface of the resin mold portion 22. The other constituent elements of the optical pickup device according to the fourth embodiment are equal to those of the optical pickup device according to the first embodiment.

In the optical pickup device according to the fourth embodiment, the flat lower surface of the resin mold portion 22 is parallel to the upper surface of the substrate portion 20 and the diffraction grating 30 is fixed to the flat lower surface thereof. Thus, the laser beam emitted from the light receiving and emitting integral-type element 1b is diffracted by the diffraction grating 30 in a direction of a light receiving surface of the light receiving portion 21. The laser beam in larger quantities can be made incident on the light receiving surface of the front monitor light receiving element 47. It is therefore possible to control the optical pickup device so as to stably output a laser beam. Further, it is possible to reproduce, record or erase information at a high speed with respect to the optical disc 16 represented by a CD or a DVD.

Fifth Embodiment

Figure 8:
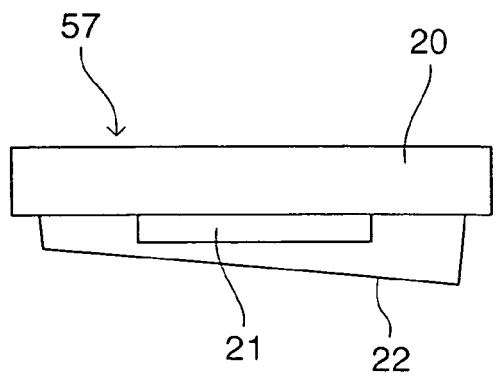
FIG. 8 is a partially enlarged view of the optical pickup device according to the fifth embodiment of the present invention.
Figure 9:
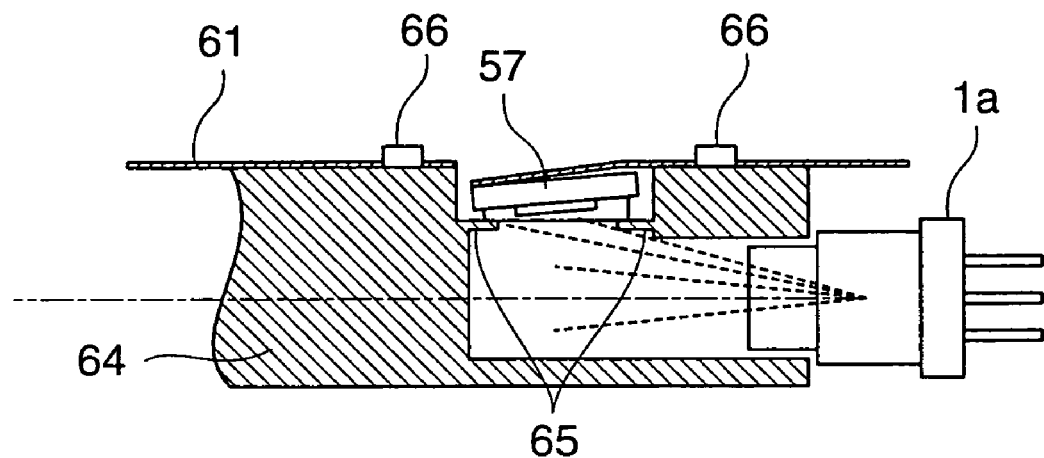
FIG. 9 is a partial cross-sectional view of a portion of the optical pickup device according to the fifth embodiment of the present invention, which portion corresponds to FIG. 3.
Figure 9:
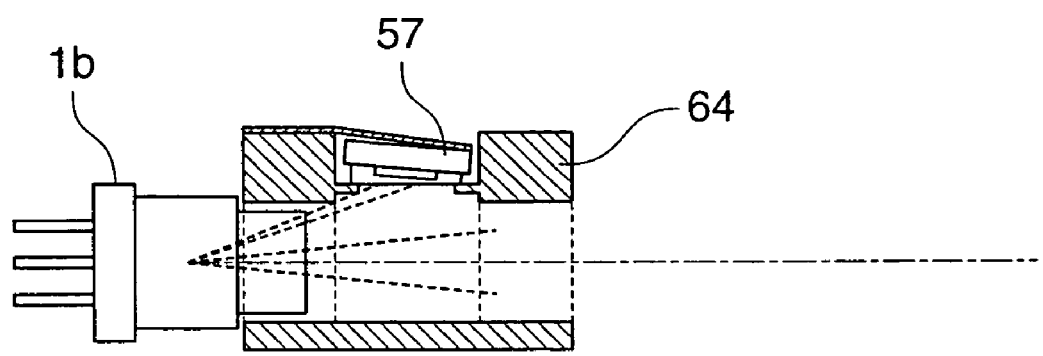
Figure 10:
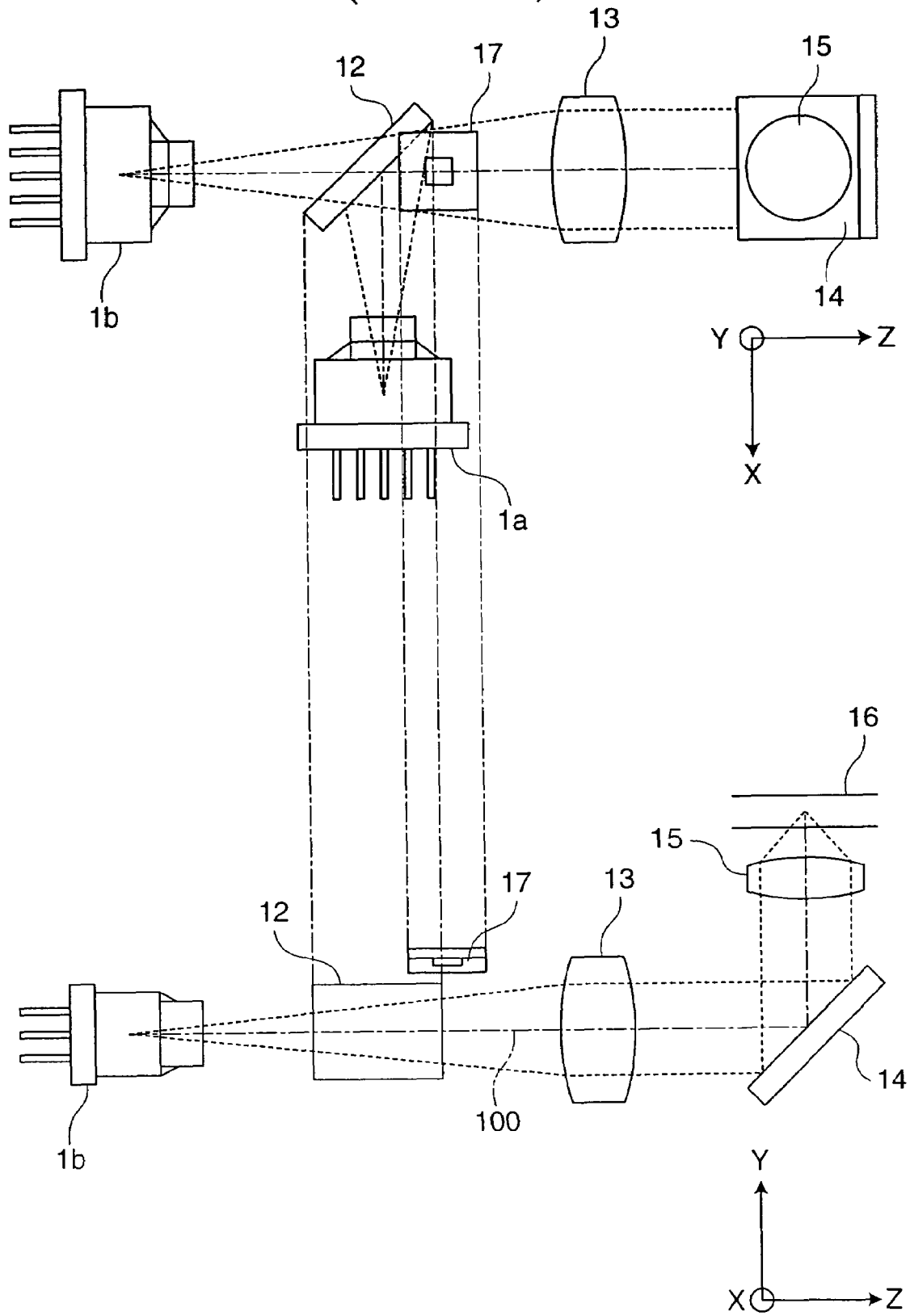
FIG. 10 is a schematic diagram of a conventional horizontal arrangement-type optical pickup device.
Figure 11:
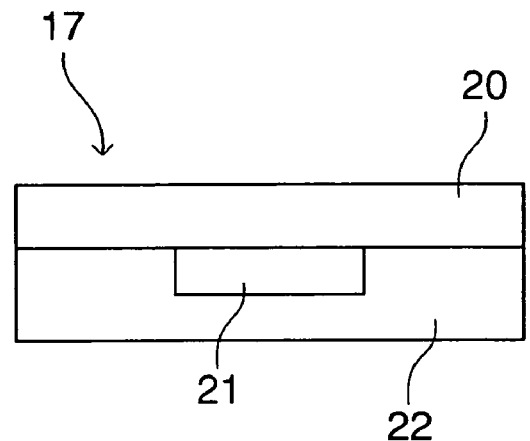
FIG. 11 is a partially enlarged view of the optical pickup device shown in FIG. 10.
Figure 12:
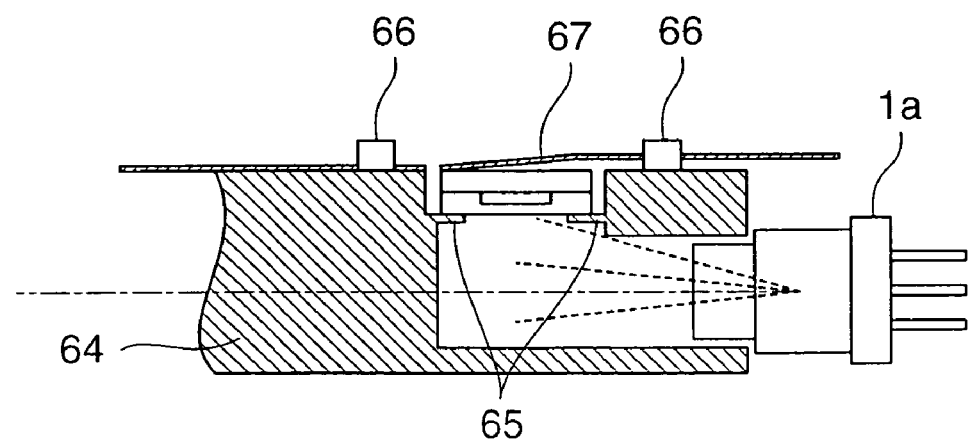
FIG. 12 is a partial cross-sectional view of the portion corresponding to FIG. 3 including a housing of the conventional optical pickup device.

As shown in FIGS. 3, 8, and 9, a front monitor light receiving element (received-light-quantity increasing unit) 57 provided in an optical pickup device according to a fifth embodiment is configured so that a substrate portion 20 and a light receiving portion 21 are arranged approximately horizontally and a lower surface of a resin mold portion 22, which lower surface is formed approximately flat, is inclined at about five degrees with respect to an upper surface of the substrate portion 20. The lower surface of the resin mold portion 22 of this front monitor light receiving element (received-light-quantity increasing unit) 57 is pressed against three abutment surfaces 65 of a housing 64. Thus, as shown in FIG. 9, the light receiving portion 21 is inclined at about five degrees toward a light receiving and emitting surface (Y-Z plane) of a light receiving and emitting integral-type element 1a and at about five degrees toward a light receiving and emitting surface (X-Y plane) of a light receiving and emitting integral-type element 1b. The other constituent elements of the optical pickup device according to the fifth embodiment are equal to those of the optical pickup device according to the first embodiment. It is noted that it is unnecessary to incline each of the abutment surfaces 65 provided on the housing 64 against which the lower surface of the resin mold portion 22 of the front monitor light receiving element 27 is pressed, unlike the optical pickup device according to the first embodiment.

In the optical pickup device according to the fifth embodiment, the light receiving portion 21 and the substrate portion 20 of the front monitor light receiving element 57 are parallel to each other, and the flat lower surface of the resin mold portion 22 is inclined as described above. As a result, the optical device according to the fifth embodiment exhibits the same advantages as those of the optical pickup device according to the first embodiment. The laser beam emitted from each light receiving and emitting integral-type element can be made incident on the light receiving surface of the light receiving portion 21 of the front monitor light receiving element 57 in larger quantities. It is therefore possible to control the optical pickup device to stably output a laser beam. Further, it is possible to reproduce, record or erase information at a high speed with respect to the optical disc 16 represented by a CD or a DVD.

As described above, the present invention can be applied to an optical pickup device capable of performing at least one of reproduction, recording, and erasure of information with respect to the optical disc represented by the CD or the DVD.

What is claimed is:

1. An optical pickup device constituted so that a laser beam emitted from a light receiving and emitting integral-type element is transmitted or reflected by a beam splitter, transformed to a parallel beam by a collimator lens, introduced into an objective lens, transmitted through the objective lens, and collected on a recording surface of an optical disc and the laser beam thus collected is returned to the light receiving and emitting integral-type element via a reverse path after the laser beam is reflected by the recording surface of the optical disc, wherein a front monitor light receiving element, which receives a part of direct light of the laser beam emitted from the light receiving and emitting element and detects a quantity of the received laser beam, is arranged between the light receiving and emitting integral-type element and the collimator lens, the front monitor light receiving element including a received-light-quantity increasing unit arranged to solely optically increase the quantity of the received laser beam, wherein the received-light-quantity increasing unit includes a substrate portion having inner and outer surfaces, a light receiving portion having a light receiving surface and fixed to the inner surface of the substrate portion, and a protruding resin mold portion that seals the light receiving portion with a transparent resin between the resin mold portion and the inner surface of the substrate portion, and wherein the received-light-quantity increasing unit is provided so that the inner surface of the substrate portion is inclined at a predetermined angle from a position approximately in parallel to an optical axis of the light receiving and emitting integral-type element toward the light receiving and emitting integral-type element and the light receiving surface of the light receiving portion is approximately in parallel to the inner surface of the substrate portion.

2. The optical pickup device according to claim 1, wherein the received-light-quantity increasing unit is provided so that a protruding surface of the resin mold portion, which protruding surface is formed approximately flat, is pressed against an abutment surface provided on an optical pickup device housing.

3. The optical pickup device according to claim 2, wherein the received-light-quantity increasing unit is provided so that the substrate portion is pressed through a flexible printed circuit board fixed to the optical pickup device housing.

4. The optical pickup device according to claim 3, wherein a slit portion is formed in the flexible printed circuit board so as to alleviate a stress of the flexible printed circuit board generated when the substrate portion is pressed.

5. An optical pickup device constituted so that a laser beam emitted from a light receiving and emitting integral-type element is transmitted or reflected by a beam splitter, transformed to a parallel beam by a collimator lens, introduced into an objective lens, transmitted through the objective lens, and collected on a recording surface of an optical disc and the laser beam thus collected is returned to the light receiving and emitting integral-type element via a reverse path after the laser beam is reflected by the recording surface of the optical disc, wherein a front monitor light receiving element, which receives a part of direct light of the laser beam emitted from the light receiving and emitting element and detects a quantity of the received laser beam, is arranged between the light receiving and emitting integral-type element and the collimator lens, the front monitor light receiving element including a received-light-quantity increasing unit arranged to solely optically increase the quantity of the received laser beam, wherein the received-light-quantity increasing unit includes a substrate portion having inner and outer surfaces, a light receiving portion having a light receiving surface and fixed to the inner surface of the substrate portion, and a protruding resin mold portion that seals the light receiving portion with a transparent resin between the resin mold portion and the inner surface of the substrate portion, and wherein the received-light-quantity increasing unit is provided so that the inner surface of the substrate portion is approximately in parallel to an optical axis of the light receiving and emitting integral-type element and the light receiving surface of the light receiving portion is inclined at a predetermined angle from a position approximately in parallel to the optical axis of the light receiving and emitting element toward the light receiving and emitting element.

6. The optical pickup device according to claim 1, wherein the received-light-quantity increasing unit is constituted so that the resin mold portion is formed into an approximately hemispherical or approximately semi-convex lens shape, thereby increasing the quantity of the laser beam received by the light receiving portion.

7. The optical pickup device according to claim 1, wherein the received-light-quantity increasing unit includes a diffraction grating on a protruding surface of the resin mold portion, the protruding surface being formed approximately flat, thereby increasing the quantity of the laser beam received by the light receiving portion.

8. An optical pickup device constituted so that a laser beam emitted from a light receiving and emitting integral-type element is transmitted or reflected by a beam splitter, transformed to a parallel beam by a collimator lens, introduced into an objective lens, transmitted through the objective lens, and collected on a recording surface of an optical disc and the laser beam thus collected is returned to the light receiving and emitting integral-type element via a reverse path after the laser beam is reflected by the recording surface of the optical disc, wherein a front monitor light receiving element, which receives a part of direct light of the laser beam emitted from the light receiving and emitting element and detects a quantity of the received laser beam, is arranged between the light receiving and emitting integral-type element and the collimator lens, the front monitor light receiving element including a received-light-quantity increasing unit arranged to solely optically increase the quantity of the received laser beam, wherein the received-light-quantity increasing unit includes a substrate portion having inner and outer surfaces, a light receiving portion having a light receiving surface and fixed to the inner surface of the substrate portion, and a protruding resin mold portion that seals the light receiving portion with a transparent resin between the resin mold portion and the inner surface of the substrate portion, and wherein the received-light-quantity increasing unit is provided so that a protruding surface of the resin mold portion is formed to be approximately flat and to be inclined at a predetermined angle with respect to the inner surface of the substrate portion and the protruding surface is pressed against an abutment surface provided on an optical pickup device housing, whereby the light receiving surface of the light receiving portion is inclined at a predetermined angle from a position approximately in parallel to an optical axis of the light receiving and emitting integral-type element toward the light receiving and emitting integral-type element.

* * * * *